(12) United States Patent
Lee et al.

(10) Patent No.: US 10,132,832 B2
(45) Date of Patent: Nov. 20, 2018

(54) METHOD FOR MANUFACTURING MICROCANTILEVER HAVING FUNCTIONAL PROBE

(71) Applicant: INDUSTRY-UNIVERSITY COOPERATION FOUNDATION SOGANG UNIVERSITY, Seoul (KR)

(72) Inventors: Jung Chul Lee, Seoul (KR); Seok Beom Kim, Seoul (KR); Jae Seol Lee, Ulsan (KR)

(73) Assignee: INDUSTRY-UNIVERSITY COOPERATION FOUNDATION SOGANG UNIVERSITY (KR)

( * ) Notice: Subject to any disclaimer, the term of this patent is extended or adjusted under 35 U.S.C. 154(b) by 0 days.

(21) Appl. No.: 15/573,420

(22) PCT Filed: Apr. 1, 2016

(86) PCT No.: PCT/KR2016/003383
§ 371 (c)(1),
(2) Date: Nov. 10, 2017

(87) PCT Pub. No.: WO2016/182201
PCT Pub. Date: Nov. 17, 2016

(65) Prior Publication Data
US 2018/0143222 A1   May 24, 2018

(30) Foreign Application Priority Data

May 13, 2015   (KR) .................. 10-2015-0066721

(51) Int. Cl.
*G01R 33/02*  (2006.01)
*G01B 5/28*  (2006.01)
(Continued)

(52) U.S. Cl.
CPC .................. *G01Q 60/42* (2013.01)

(58) Field of Classification Search
USPC ........ 850/32, 40, 42, 45, 48, 52, 53, 55, 56, 850/58, 60, 61, 63; 250/306, 307;
(Continued)

(56) References Cited

U.S. PATENT DOCUMENTS

| 7,497,111 B2* | 3/2009 | Ina ......................... B82Y 35/00 73/105 |
| 7,677,088 B2* | 3/2010 | King ....................... B82Y 35/00 73/105 |

(Continued)

FOREIGN PATENT DOCUMENTS

| KR | 10-2005-0025702 | 3/2005 |
| KR | 10-2006-0000815 | 1/2006 |

(Continued)

OTHER PUBLICATIONS

International Search Report for International PCT Application No. PCT/KR2016/003383 dated Aug. 2, 2016.
(Continued)

*Primary Examiner* — Bernard Souw
(74) *Attorney, Agent, or Firm* — Kunzler, PC

(57) ABSTRACT

A method for manufacturing a microcantilever having a cantilever and a functional probe provided on the cantilever may include steps of: providing a probe mold which accommodates a liquid probe solution in which quantum dots for the functional probe are mixed, and has a groove corresponding to the shape of the functional probe; bringing a cantilever into contact with the probe mold on which the groove is formed to correspond to the location of the functional probe; forming the functional probe on the cantilever by curing the probe solution accommodated in the groove in a state where the cantilever contacts the probe mold; and separating the cantilever from the probe mold.

11 Claims, 10 Drawing Sheets

(51) Int. Cl.
*G01Q 60/16* (2010.01)
*G01Q 60/22* (2010.01)
*G01Q 60/42* (2010.01)

(58) Field of Classification Search
USPC .................. 977/700, 732, 849, 860; 73/105
See application file for complete search history.

(56) References Cited

U.S. PATENT DOCUMENTS

| | | | |
|---|---|---|---|
| 7,735,357 B2 * | 6/2010 | Kitazawa | G01Q 70/12 |
| | | | 73/105 |
| 8,056,402 B2 * | 11/2011 | Hecker | G01Q 70/14 |
| | | | 73/105 |
| 8,979,149 B2 * | 3/2015 | Sun | B25J 7/00 |
| | | | 294/86.4 |
| 2006/0192114 A1 * | 8/2006 | Adachi | G01Q 70/10 |
| | | | 250/306 |
| 2007/0257389 A1 * | 11/2007 | Ruf | B81C 1/0046 |
| | | | 264/40.1 |
| 2009/0056428 A1 * | 3/2009 | King | B82Y 35/00 |
| | | | 73/105 |
| 2009/0114000 A1 * | 5/2009 | Hecker | G01Q 70/14 |
| | | | 73/105 |

FOREIGN PATENT DOCUMENTS

| | | |
|---|---|---|
| KR | 10-2006-0007641 | 1/2006 |
| KR | 10-2012-0112295 | 10/2012 |

OTHER PUBLICATIONS

Lee, Jae Seol et al., "Fabrication of Hydrogel Atomic Force Microscope Cantilevers with Functional Tips," Proceedings pf the Korean Society of Mechanical Engineers, Nov. 2014, pp. 1497-1501.
Addae-Mensah, Kweku A. et al., "A Flexible, Quantum Dot-labeled Cantilever Post Array for Studying Cellular Microforces," Sensors and Actuators A 136, Jan. 12, 2007, pp. 385-397.

* cited by examiner

[Fig. 1]
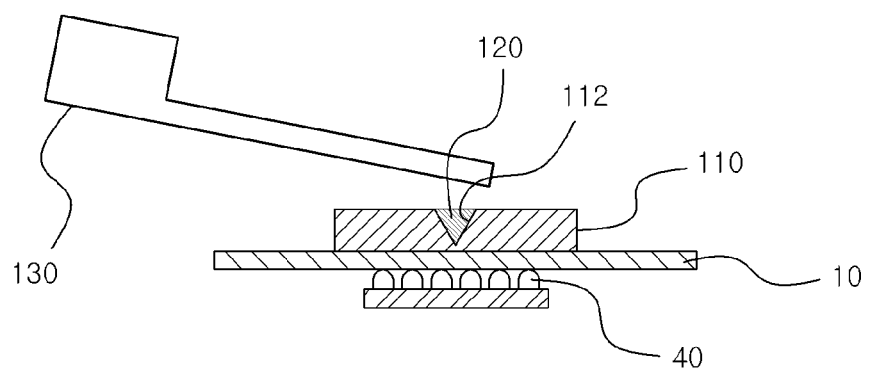
[Fig. 2]
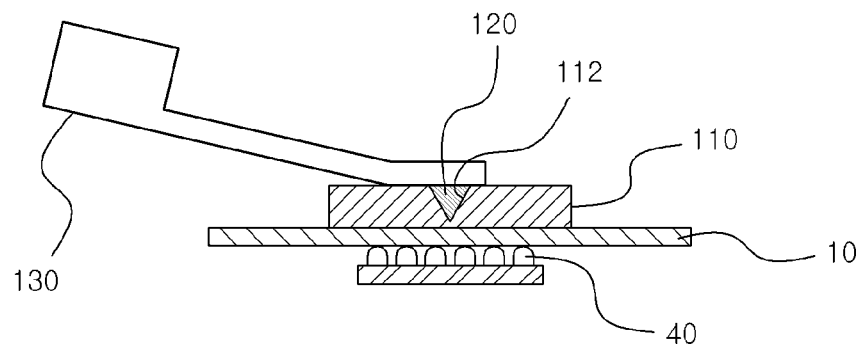

[Fig. 3]
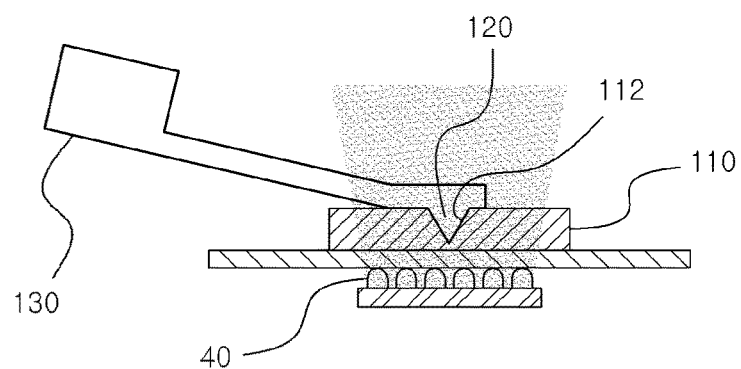
[Fig. 4]
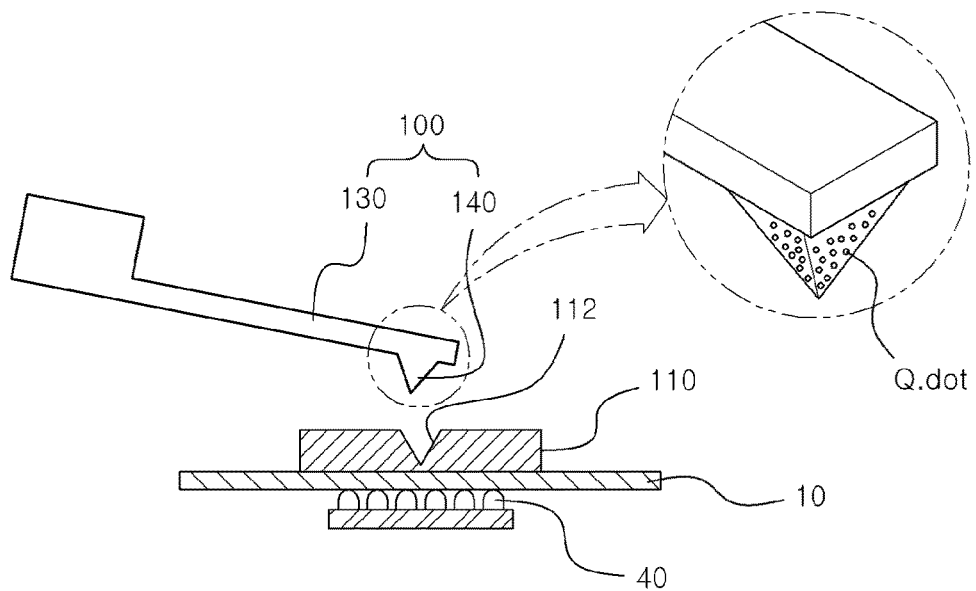

[Fig. 5]
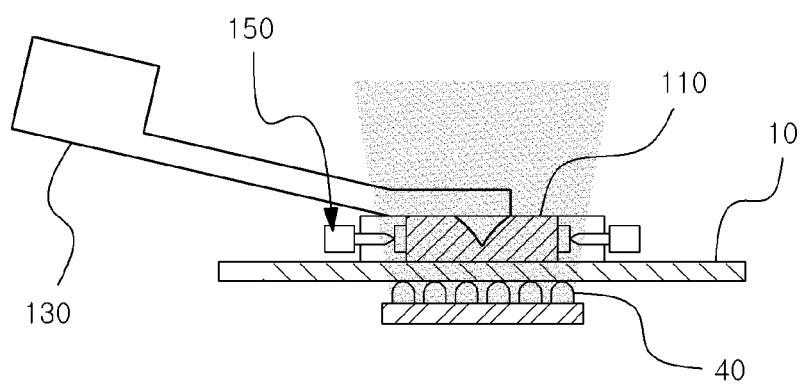

[Fig. 6]
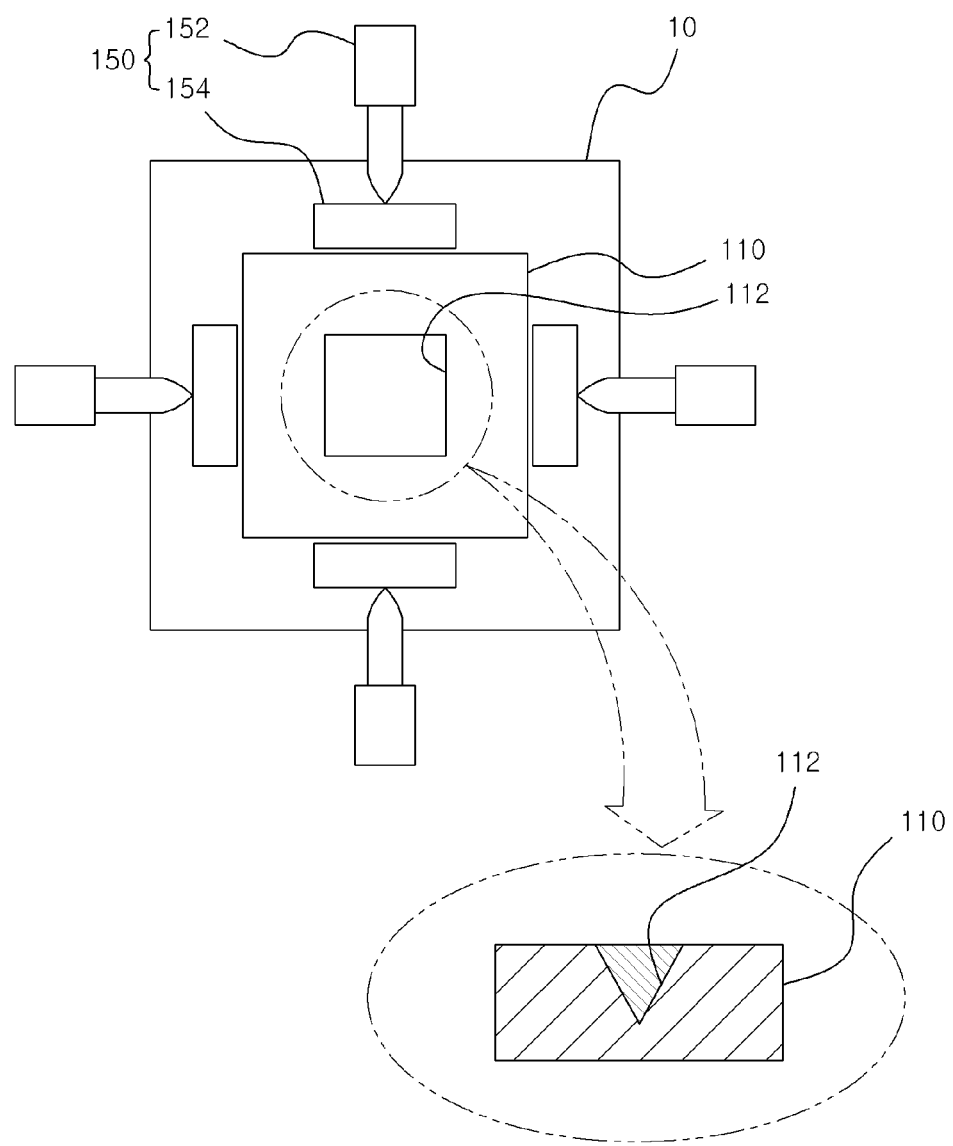

[Fig. 7]
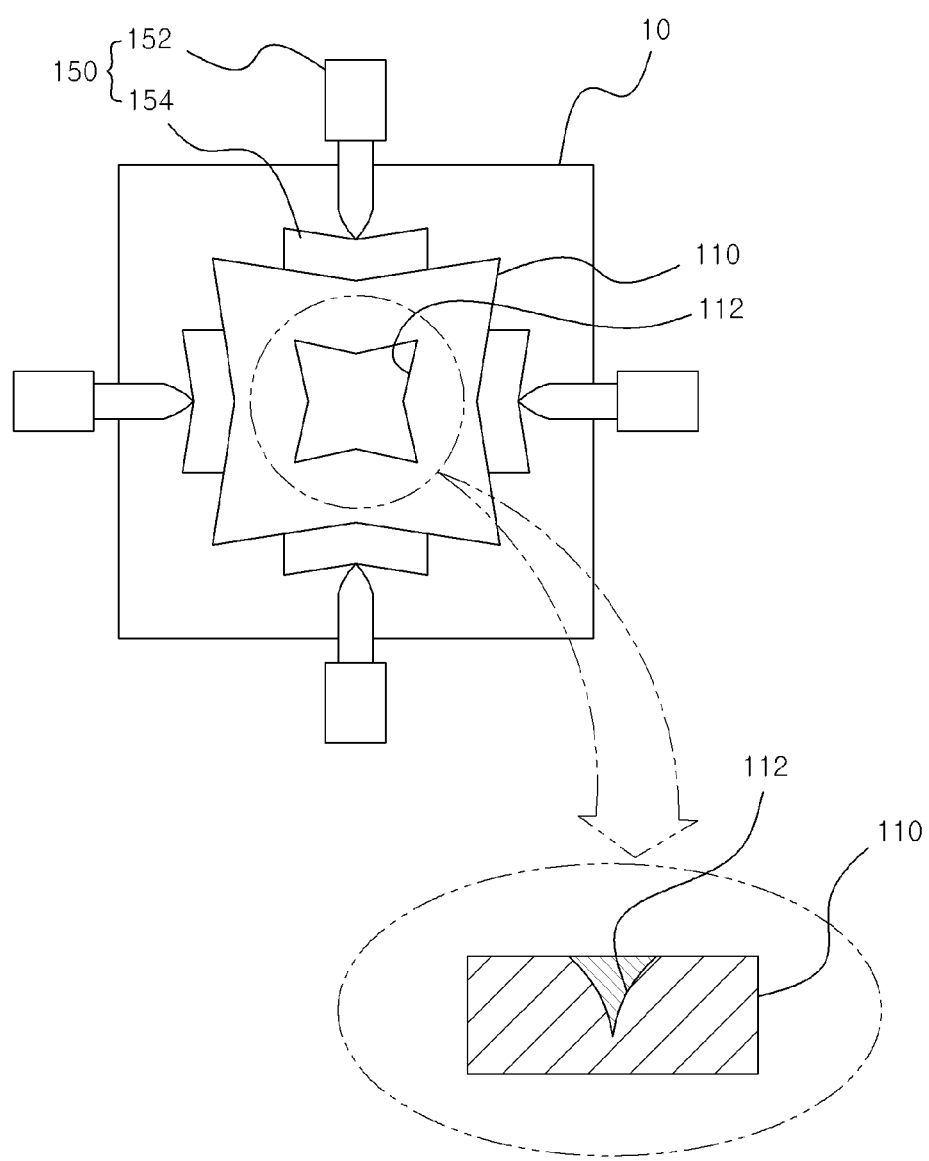

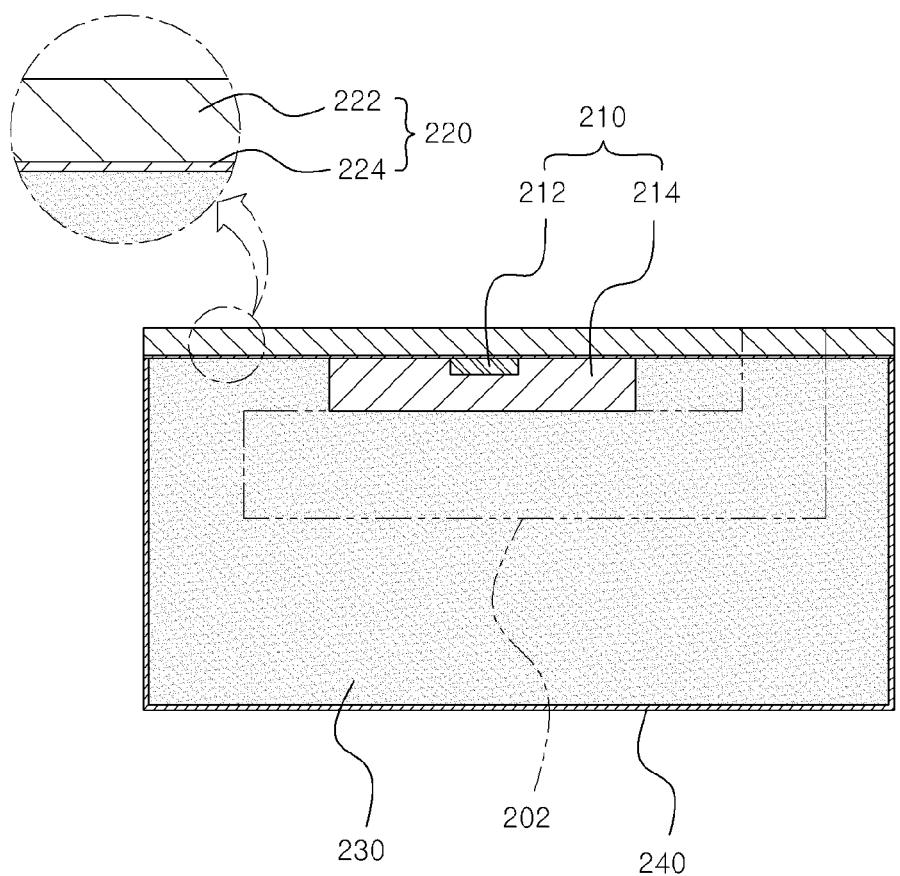
[Fig. 8]

[Fig. 9]
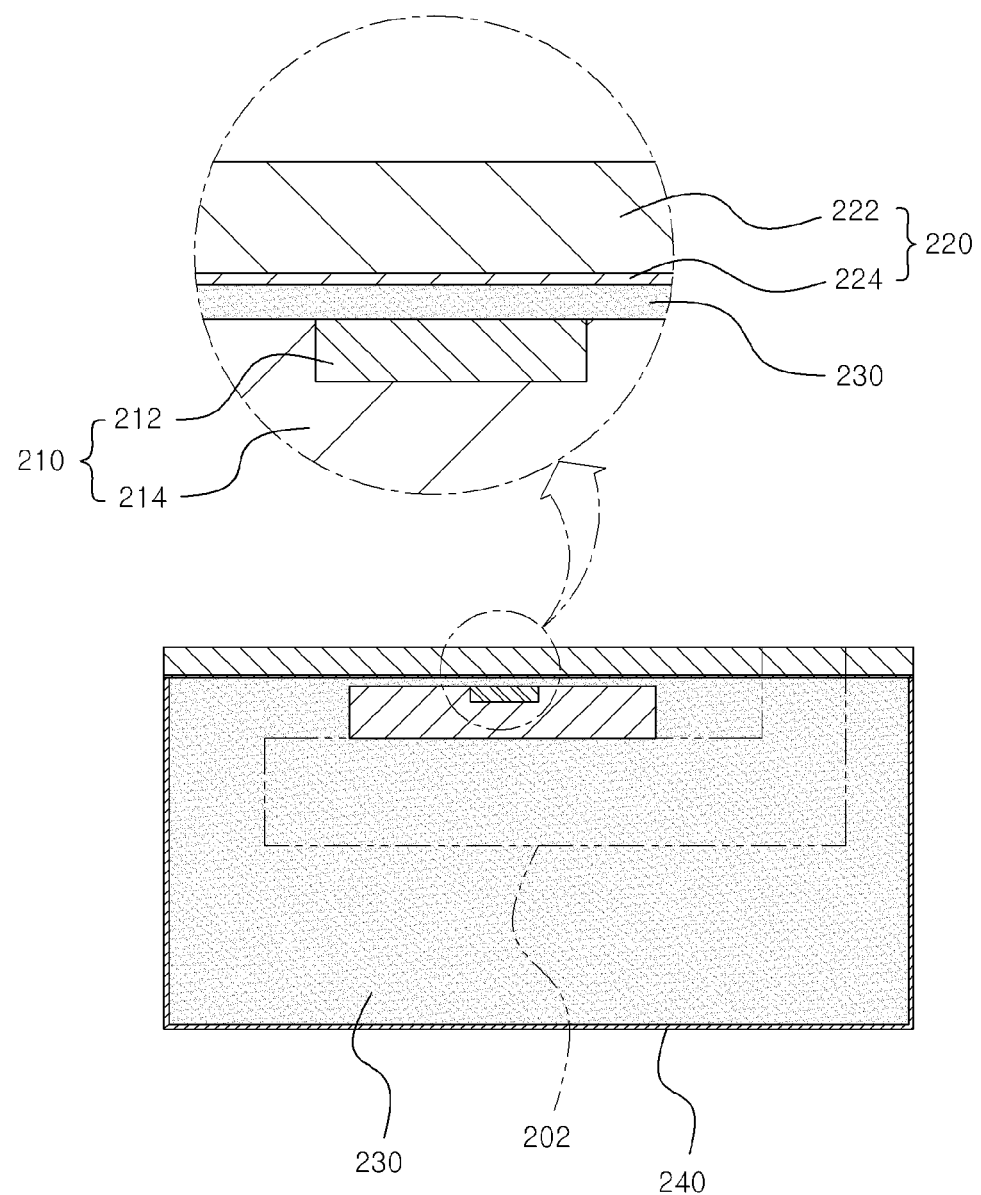

[Fig. 10]
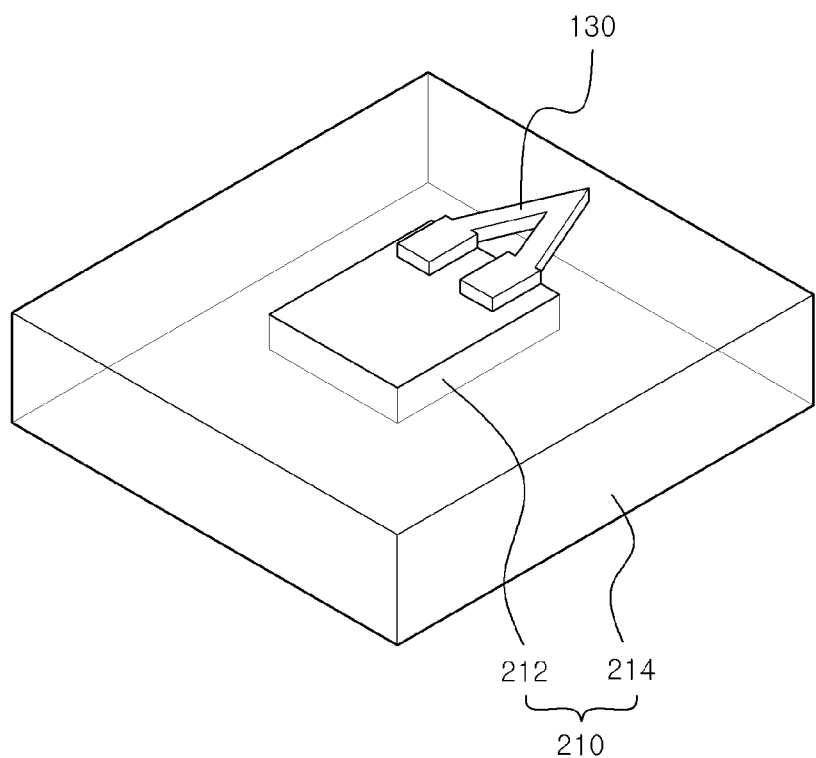

[Fig. 11]
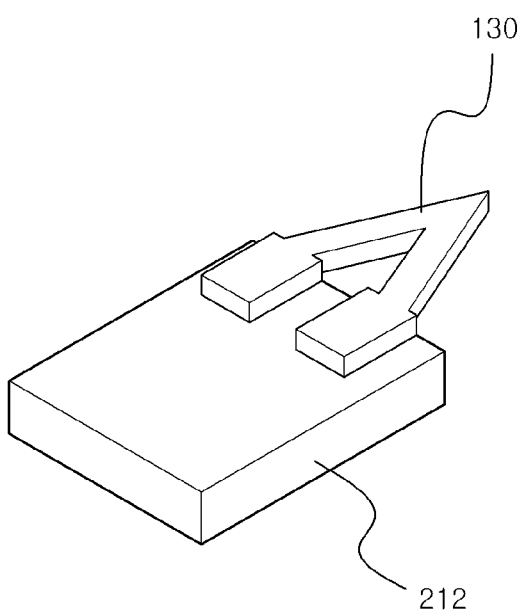

[Fig. 12]
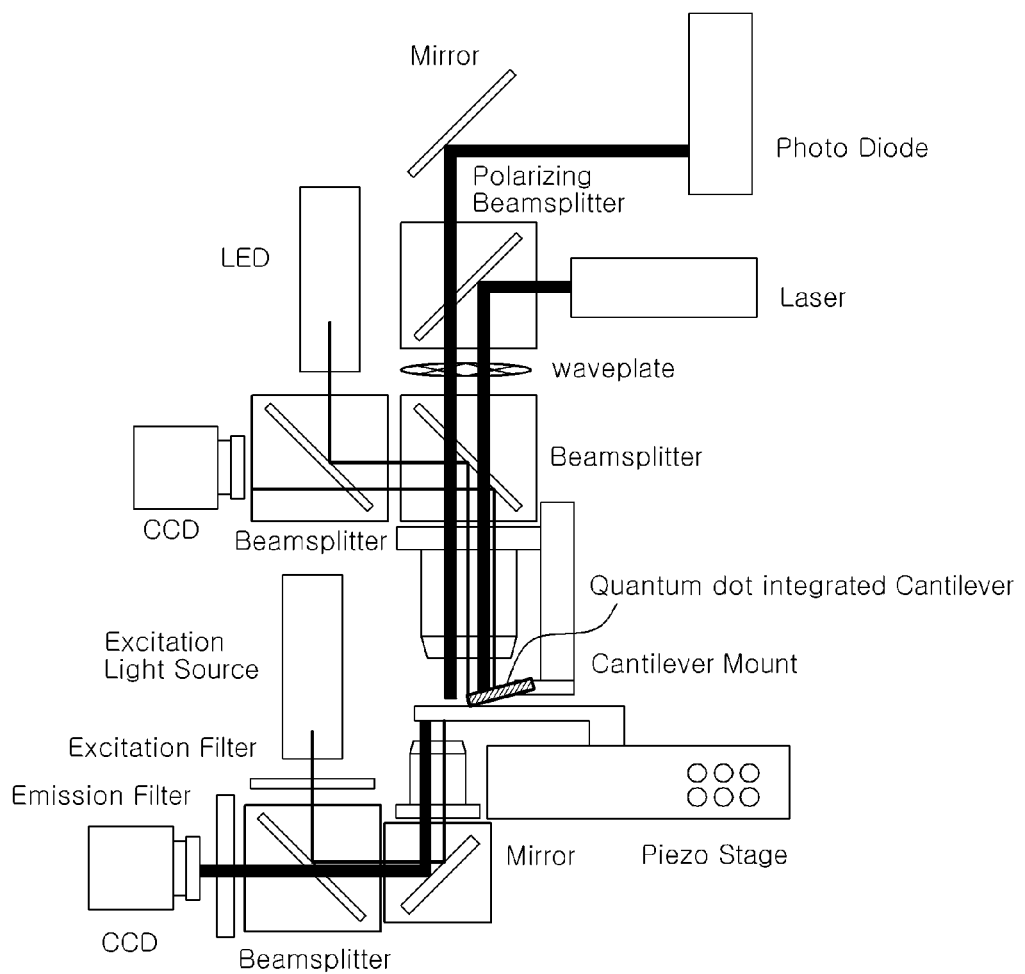

METHOD FOR MANUFACTURING MICROCANTILEVER HAVING FUNCTIONAL PROBE

TECHNICAL FIELD

The present invention relates to a method for manufacturing a microcantilever and more particularly, to a method for manufacturing a microcantilever having a functional probe capable of measuring a temperature at a scanning probe microscopic resolution level.

BACKGROUND ART

A scanning probe microscope uses a microcantilever called a cantilever and a probe with a size of several nanometers is formed at the end thereof.

The scanning probe microscope scans the surface of a sample by the probe to measure up to a size of 0.01 nanometer, one several tenths of the atomic diameter, has tens of millions of magnification while an optical microscope has a maximum of thousands of magnification and an electron microscope has hundreds of thousands of magnification, and may directly measure an atomic structure using high resolution.

Further, the scanning probe microscope may measure characteristics of the surface of the sample such as viscoelasticity and hardness, has been used as a core device of the nano industry, such as manufacturing an object of nanometers by directly manipulating the sample using a probe with a size of several nanometers, and may determine the surface shape and electric or magnetic properties of the sample at the nano-level resolution.

The scanning probe microscope uses an operational principle in which the cantilever is bent by the atomic force when the probe at the end of the cantilever is closet to the sample, and uses a photo diode which reflects a laser beam to the cantilever and measures an angle of the laser beam reflected from the upper surface of the cantilever in order to measure the cantilever which is bent up and down.

The operational principle of the scanning probe microscope has already been widely disclosed and the detailed description is omitted, and the core part of the scanning probe microscope is a cantilever made of silicon. However, the probe formed at the end of the cantilever may determine the resolution or the use of the scanning probe microscope and a scanning probe microscope having a probe formed on a microcantilever is disclosed in Korean Patent Publication No. 10-2005-0025702.

When describing Korean Patent Publication No. 10-2005-0025702, a tip 215 is provided by patterning a silicon wafer 200. Accordingly, in order to provide the tip 215 in various shapes, a mask having a desired shape needs to be provided, and a complicated process of replacing the mask is required.

DISCLOSURE

Technical Problem

The present invention has been made in an effort to provide a method for manufacturing a microcantilever capable of measuring a temperature.

The present invention has been also made in an effort to provide a method for manufacturing a microcantilever capable of removing a conventional complicated etching process of forming a probe on the microcantilever using a mask.

Technical Solution

An embodiment of the present invention provides a method for manufacturing a microcantilever having a cantilever and a functional probe provided on the cantilever, the method including steps of: providing a probe mold which accommodates a liquid probe solution in which quantum dots for the functional probe are mixed, and has a groove corresponding to the shape of the functional probe; bringing a cantilever into contact with the probe mold on which the groove is formed to correspond to the location of the functional probe; forming the functional probe on the cantilever by curing the probe solution accommodated in the groove in a state where the cantilever contacts the probe mold; and separating the cantilever from the probe mold.

A quantum dot is a zero-dimensional semiconductor crystalline material having a diameter of several tens of nanometers (nm) or less, and has a unique quantum mechanical characteristic due to a too small size. For example, the quantum dot absorbs sunlight from a short wavelength to a long wavelength depending on the size of the quantum dot and has less photobleaching that emits brighter fluorescent light than conventional fluorescent materials and loses fluorescence properties over time. In addition, the quantum dot has a property that the wavelength or brightness of the fluorescent light varies depending on the temperature. By using such a property, it is possible to measure the surface temperature of the sample by measuring a change in wavelength or brightness depending on the temperature. In particular, when quantum dots are put in the probe, a tip of the probe has a diameter of several nanometers to several micrometers, thereby measuring a temperature and drawing a temperature map at a scanning probe microscopic resolution level.

Further, since a method of measuring a temperature using a scanning thermal microscope (SThM) in the related art uses a thermocouple, a lot of processes and costs are required for manufacturing a measuring probe, but in the case of a method using a quantum dot integrated probe, there is an advantage in that the probe may be manufactured by a simple process and a low cost.

In addition, in a method using the fluorescent light in the related art, since the quantum dots or the fluorescent material are directly put to the sample, the sample is damaged in many cases, but in the case of using the probe using the quantum dots, there is an advantage in that the sample is not damaged.

Further, in a process of manufacturing a probe through photolithography using a mask in the related art, complicated processes such as exposure and cleaning processes using the mask need to be sequentially performed. However, in the present invention, the probe can be simply manufactured by curing a probe solution in a groove.

Further, the probe provided to protrude from the surface of the cantilever can be manufactured in various shapes such as a hemisphere, a polypyramid, and a circular cone according to the shape of the groove. As a result, if the shape of the groove which is already formed in the probe mold may be modified, probes having various shapes can be provided.

Therefore, in the present invention, the shape of the probe mold may be modified to modify the shape of the groove and form the probe corresponding to the shape of the groove. For example, it is possible to press the probe mold by using a pressing member capable of pressing the probe mold from the outside and to provide functional probes having various shapes corresponding to the shape of the groove modified in the pressing process.

The probe mold may be changed symmetrically or asymmetrically by the pressing member. For example, the probe mold is pressed in one direction to obtain an asymmetric probe, but the probe mold is pressed in a plurality of directions to obtain a symmetric probe.

On the other hand, the height of the probe formed to correspond to the groove pressed by the pressing member is relatively larger than the height of the probe formed to correspond to the groove before pressing, and the tip of the probe is relatively sharpened.

The sharpness of the tip is directly connected with the resolution when the microcantilever is used for the scanning probe microscope, and the forming of the sharp tip is a significantly important technical part in the process of manufacturing the microcantilever having the probe which may be used for the scanning probe microscope.

That is, probes having various shapes can be manufactured by pressing the probe mold, and a sharper probe can be easily manufactured.

The probe solution mixed with the quantum dots can be provided to the groove in a liquid form and may use curable metals, synthetic resins, or the like later. For example, a probe may be manufactured by curing through heating including a thermal curing agent, but if a UV curing agent is included, the probe may be formed by curing through ultraviolet rays.

On the other hand, after curing the probe solution, the cantilever needs to be removed from the probe mold. In this process, the probe needs to be relatively easily separated from the probe mold. Accordingly, in the present invention, as the cured liquid probe solution, a material having a relatively stronger bonding property to the cantilever than the probe mold may be selected. For example, the probe solution may include any one of 1,6-hexanediol diacrylate (HDDA) and polyethylene glycol diacrylate (PEGDA), and the probe mold may include polydimethylsiloxane (PDMS).

Herein, the cantilever may be formed of the same material as the probe solution to a material having excellent interbonding, and the probe and the cantilever using the aforementioned material are boned to each other well, but the functional probe is not bonded to the probe mold. The reason is that an oxygen inhibition layer on the surface of the probe mold having high oxygen permeability inhibits the polymerization of the cantilever synthetic resin. Accordingly, in the process of removing the cantilever bonded with the probe from the probe mold, there is no problem that the probe is attached to the probe mold and the probe may be easily separated from the probe mold.

Further, the cantilever may be provided by steps of providing a base block having a bonding base and a non-bonding base, providing a liquid cantilever synthetic resin on the upper surface of the base block to correspond to the thickness of the cantilever, and curing the cantilever synthetic resin via a boundary between the bonding base and the non-bonding base by irradiating light to the liquid cantilever synthetic resin including a light curing agent, and the bonding base may have a relatively stronger bonding property to the cured cantilever synthetic resin than the non-bonding base.

The liquid cantilever synthetic resin is cured to correspond to a desired shape of the cantilever and the non-bonding base is removed from the bonding base, thereby provide a microcantilever of which one end is maintained to be bonded to the bonding base and the other end is maintained as a free end. In this case, since the bonding base has a relatively stronger bonding property to the cured cantilever synthetic resin than the non-bonding base, only the non-bonding base may be relatively easily separated from the cantilever.

Further, the non-bonding base may use a material having a non-bonding property to the cured cantilever synthetic resin. In particular, the non-bonding base includes polydimethylsiloxane (PDMS), the cantilever synthetic resin includes polyethylene glycol diacrylate (PEGDA), and the cantilever formed by curing the liquid cantilever synthetic resin is bonded to the upper surface of the bonding base, but is not bonded to the upper surface of the non-bonding base. Accordingly, in the process of removing the non-bonding base from the bonding base, the non-bonding base may be easily separated from the cured cantilever synthetic resin.

Meanwhile, the providing of the liquid cantilever synthetic resin with a thickness corresponding to the thickness of the cantilever may include injecting the liquid cantilever synthetic resin between the base block and the cover block which are disposed with a gap corresponding to the thickness of the cantilever. The method of injecting the liquid cantilever synthetic resin between the base block and the cover block may include various methods such as directly injecting the liquid cantilever synthetic resin by inserting a syringe or a nozzle into the gap and injecting the liquid cantilever synthetic resin by increasing pressure while the base block and the cover block are immersed in the liquid cantilever synthetic resin. Further, preferably, while the upper surface of the base block and the cover block are in close contact with each other, the base block and the cover block are spaced apart from each other to inject the liquid cantilever synthetic resin between the base block and the cover block by a capillary phenomenon. In this case, a gap between the base block and the cover block may correspond to the thickness of the cantilever, and a process of injecting the liquid cantilever synthetic resin into a very small gap using the capillary phenomenon is enabled and as a result, a very thin cantilever can be manufactured.

Further, the cover block may use a material having a non-bonding property to the cured cantilever synthetic resin so as to easily separate the cured liquid cantilever synthetic resin from the cover block. For example, the cover block may include polydimethylsiloxane (PDMS), the cantilever synthetic resin may include polyethylene glycol diacrylate (PEGDA), and the cantilever formed by curing the liquid cantilever synthetic resin may not be bonded to the cover block.

As the bonding base, glass having an excellent bonding property to the cured liquid cantilever synthetic resin may be used.

For reference, in the curing of the liquid cantilever synthetic resin via the bonding base and the non-bonding base, a light curing agent may be included in the cantilever synthetic resin and the liquid cantilever synthetic resin may be cured by irradiating UV rays or light having a specific wavelength to the cantilever synthetic resin. In photolithography capable of patterning a cantilever using light having a specific wavelength, a patterning technique has been already developed up to a nano level, and a cantilever may be manufactured with a more precise and designed shape through the photolithography method.

Advantageous Effects

When quantum dots are put in the probe, a tip of the probe has a diameter of several nanometers to several micrometers, thereby providing a microcantilever capable of measuring a temperature and drawing a temperature map at a scanning probe microscopic resolution level, and since the quantum dots have less photobleaching, it is advantageous to measure the temperature.

Further, in a process of manufacturing a probe through photolithography using a mask in the related art, complicated processes such as exposure and cleaning processes using a mask need to be sequentially performed. However, according to the method for manufacturing the microcantilever according to the present invention, a probe having quantum dots can be simply manufactured by curing a probe solution in the groove.

Further, for a probe having a desired shape through the photolithography using the mask in the related art, the mask needs to be replaced every time and a complicated photolithography process needs to be performed again. However, according to the method for manufacturing the microcantilever according to the present invention, probes having various shapes can be simply provided by changing the shape of the groove using a pressing member.

DESCRIPTION OF DRAWINGS

FIGS. 1 to 4 are diagrams for describing a process of forming a probe on a cantilever using a probe mold.

FIG. 5 is a diagram of a pressing member which presses the probe mold.

FIGS. 6 and 7 are plan views for describing a state of the probe mold which is pressed by the pressing member.

FIG. 8 is a state diagram in which a liquid cantilever synthetic resin is filled in a accommodating tank while a stage seated with a base block moves in the accommodating tank and the base block is in close contact with the lower surface of a cover block.

FIG. 9 is a state diagram in which the stage is moved downward to inject the cantilever synthetic resin between the upper surface of a bonding base and a non-bonding base and the lower surface of the cover block using a capillary phenomenon.

FIG. 10 is a state diagram of a microcantilever which is formed through the bonding base and the non-bonding base through lithography.

FIG. 11 is a state diagram of the microcantilever in which one side is bonded to the bonding base by removing the non-bonding base.

FIG. 12 is a diagram of a scanning probe microscope for measuring a temperature of a sample using the microcantilever.

MODES OF THE INVENTION

Hereinafter, preferred embodiments of the present invention will be described in detail with reference to the annexed drawings, but should be not construed as limiting or restricting the present invention. For reference, in this specification, the same reference numerals designate substantially the same elements. Under such a rule, contents described in other drawings may be cited and described and contents that are determined obviously to those skilled in the art or repeated may be omitted.

A material of a cantilever may use a hard material such as silicon, silicon nitride, and silicon oxide, but the cantilever made of the aforementioned material is difficult to respond to small stress or force and thus, the application as a sensitive sensor may be restricted. Accordingly, the material of the cantilever used in the method for manufacturing the cantilever of the present invention may use a soft and sensitive material and may use a hydrogel. In particular, the material may use polyethylene glycol diacrylate (Mw=250, 575; Sigma Aldrich) belonging to the hydrogel, and the synthetic resin for the cantilever may use any one of an acrylonitrile butadiene styrene (ABS) resin, poly methyl methacrylate (PMMA), polyimide, polyacrylate, polyurethane, poly hydroxyethyl methacrylate (PHEMA), poly vinyl alcohol, polyvinyl pyrrolidone, and acryloylacetone/acrylamide/N,N'-methylene bisacrylamide (MBAAm).

Further, the probe solution used in the embodiment includes basically quantum dots and may add any one of diacrylate (HDDA) and polyethylene glycol diacrylate (PEGDA) thereto. Further, a photoinitiator (UV curing agent) is added to the probe solution. The photoinitiator may use phenylbis(2,4,6-trimethylbenzoyl) and phosphine oxide (Sigma Aldrich). Meanwhile, the probe mold may use polydimethylsiloxane (PDMS).

Further, the probe mold will be described below again in the process of forming the probe, but since the cantilever needs to be removed from the probe mold after curing the probe solution, it is required to relatively easily separate the probe from the probe mold in the process. Accordingly, the cured liquid probe solution may select a material having a relatively stronger bonding property to the cantilever than that of the probe mold and the aforementioned materials have such a property.

The probe mold 110 is placed on a slide glass 10 and the slide glass 10 may be placed on an XY scanner for movement of right and left. A UV LED 40 may be disposed below the slide glass 10 and the UV LED 40 may use a UV LED which emits a wavelength X of 395 nm. Further, a cantilever 130 is mounted on a Z scanner capable of adjusting the height in a state where the probe is not formed to be brought into contact with and separated from a probe mold 110. For reference, a CCD camera may be connected to a PC and a monitor to monitor the manufacturing process.

Hereinafter, a process for forming the probe on the cantilever using the probe mold will be described with reference to FIGS. 1 to 4.

First, referring to FIG. 1, a liquid probe solution 120 including quantum dots for measuring the temperature is provided to a groove 112 of the probe mold 110 and the cantilever 130 is approached. Thereafter, as illustrated in FIG. 2, the cantilever 130 is brought into close contact with the groove 112 to correspond to a location where the probe is to be provided. Then, as illustrated in FIG. 3, while the cantilever 130 is in close contact with the probe mold 110, the liquid probe solution 120 in the groove 112 is cured through UV rays by operating the UV LED 40. The cured liquid probe solution 120 may be used as a probe, and as illustrated in FIG. 4, when the cantilever 130 is detached from the probe mold 110, the probe 140 is attached onto the cantilever 130 to be removed from the groove 112 of the probe mold 110. A microcantilever 100 in which the probe 140 is formed on the top of the end of the cantilever 130 may be manufactured.

Herein, since the probe 140 has a relatively stronger bonding property to the cantilever, the probe 140 may be easily detached from the probe mold 110. Particularly, the probe mold 110 made of polydimethylsiloxane is a material which is not easily bonded with other synthetic resins. The reason is that an oxygen inhibition layer around the probe mold 110 inhibits polymerization of the probe solution 120 for manufacturing the probe 140.

Further, since the cantilever 130 is also provided with a similar material to the probe 140, inter-bonding is easy, but the cantilever 130 is not bonded to the probe mold 110 made of polydimethylsiloxane.

In the related art, in a process of manufacturing the probe through photolithography using a mask, complicated processes such as exposure and cleaning processes using a mask need to be sequentially preformed. However, according to the method for manufacturing the microcantilever according to the present invention, the probe can be simply manufactured by curing the probe solution in the groove.

Further, in the present invention, a method of providing one microcantilever is described as an example, but in order to simultaneously form a plurality of microcantilevers, a probe mold having a plurality of grooves and a cantilever disk corresponding to a plurality of cantilever may be used, the cantilever disk may be cut and used to correspond to one microcantilever, and the probe solution in the groove is optically cured to produce a large amount of microcantilever at the same time.

Hereinafter, a method for manufacturing a microcantilever to which a pressing member capable of easily manufacturing probes having various shapes is applied will be described.

FIG. 5 is a diagram of a pressing member which presses the probe mold and FIGS. 6 and 7 are plan views for describing a state of the probe mold which is pressed by the pressing member.

In order to implement the method for manufacturing the microcantilever, facilities illustrated in FIG. 6 may basically include a UV LED, a scanner, and a CCD, and the description for the same facilities may refer to the description of the aforementioned embodiment, and the embodiment will be described based on the pressing member.

The pressing member 150 placed on the slide glass 10 together with the probe mold 110 presses the probe mold 110 from the outside along the circumference of the probe mold 110 to change the shape of the groove 112, and as a result, the probes having various shapes can be manufactured.

Pressing rods 152 for pressing each side surface of a rectangular probe mold 110 are disposed in four directions, and a buffer block 154 is disposed between the pressing rod 152 and the probe mold 110, thereby preventing the probe mold 110 from being damaged by the pressing rods 152. The buffer block 154 may be provided with a soft material to be refracted by the pressing rod 152.

Actually, the probe mold is disposed in a hollow frame and the pressing rod provided with a bolt is rotatably installed on the frame to indirectly press the buffer block using the pressing rod, thereby designing the probe mold to be pressed.

As illustrated in FIG. 6, the groove 112 of the probe mold 110 which is not pressed by the pressing rod 152 maintains a quadrangular pyramid shape, but as illustrated in FIG. 7, the shape of the groove 112 of the probe mold 110 which is pressed by the pressing rod 152 is modified to a dent quadrangular pyramid.

For reference, the process of pressing the probe mold using the pressing member may be performed at any step before curing the probe solution. For example, the probe mold may also be pressed at any step before and after providing the probe solution to the groove, and the probe mold may also be pressed at any step before and after connecting the cantilever to the probe mold.

The probe formed through the pressing member 150 is relatively longer than the probe formed to correspond to the groove before pressing and relatively sharpened. This means that a probe for a scanning probe microscope with higher resolution can be manufactured.

FIG. 8 is a state diagram in which a liquid cantilever synthetic resin is filled in a accommodating tank while a stage seated with a base block moves in the accommodating tank and the base block is in close contact with the lower surface of a cover block, FIG. 9 is a state diagram in which the stage is moved downward to inject the cantilever synthetic resin between the upper surface of a bonding base and a non-bonding base and the lower surface of the cover block using a capillary phenomenon, FIG. 10 is a state diagram of a microcantilever which is formed through the bonding base and the non-bonding base through a lithography, and FIG. 11 is a state diagram of the microcantilever in which one side is bonded to the bonding base by removing the non-bonding base.

The cantilever synthetic resin used in the method for manufacturing the microcantilever includes polyethylene glycol diacrylate (Mw=250, 575; Sigma Aldrich) belonging to the hydrogel.

Further, in the embodiment, the photoinitiator (UV curing agent) is added to polyethylene glycol diacrylate at a mass ratio of 1:99. Herein, the photoinitiator may use phenylbis (2,4,6-trimethylbenzoyl) and phosphine oxide (Sigma Aldrich). In addition, the polyethylene glycol diacrylate added in the photoinitiator is stirred for 24 hours.

A base block 210 is placed on a stage 202, and first, a method for manufacturing the base block 210 will be simply described.

The base block 210 includes a bonding base 212 and a non-bonding base 214, the upper surfaces of the bonding base 212 and the non-bonding base 214 are formed as one surface, and the upper surface of the base block 210 may be flatly provided so that the microcantilever is seated later. Specifically, a cut glass slice piece that may be used as the bonding base 212 is placed on a Petri dish, and polydimethylsiloxane for the non-bonding base 214 is filled into the dish. Thereafter, after curing, as described above, the non-bonding base 214 is cut as designed so that the upper surfaces of the bonding base 212 and the non-bonding base 214 form one flat surface.

As illustrated in FIG. 8, the base block 210 formed as such is installed on a 3-axis micro stage 202 capable of moving up and down and left and right, and disposed on an empty accommodating tank 240. In addition, the accommodating tank 240 is covered by a cover block 220. Thereafter, the base block 210 is vertically moved on the stage 202 to smoothly contact the cover block 220 and the prepared liquid cantilever synthetic resin 230 may be filled in the accommodating tank 240.

Thereafter, as illustrated in FIG. 9, when the base block 210 is separated from the cover block 220 by a designed distance, the cantilever synthetic resin 230 immediately moves to fill a gap between the base block 210 and the cover block 220 by the capillary force. The separation gap finally determines a thickness of the microcantilever 130.

In the embodiment, the cantilever synthetic resin 230 is injected into the separated gap between the base block and the cover block by the capillary phenomenon, but in some cases, the cantilever synthetic resin may be directly printed or applied on the base block. Further, it is also possible to select a method of separating the base block from the bottom of the accommodating tank filled with the cantilever synthetic resin (in this case, the bottom of the accommodating tank may correspond to the cover block). In either case, the gap between the base block and the cover block may correspond to the thickness of the microcantilever.

Thereafter, the microcantilever 130 is crosslinked via the boundary between the bonding base 212 and the non-bonding base 214 of the base block 210 with desired shape and size by using a dynamic mask lithography generated by a beam projector or a UV LED having a wavelength λ of 405 nm. The lithography process may be widely applied to techniques already well-known within the scope of curing the liquid cantilever synthetic resin 230 in a microcantilever shape in addition to the method described in the embodiment. For reference, in the embodiment, exposure density and time of light are 0.15 mW/cm2 and 2 to 5 seconds, respectively.

Meanwhile, since the non-bonding base 214 made of polydimethylsiloxane is not easily bonded with other synthetic resins, the non-bonding base 214 is a material which is widely used during molding. The reason is that the oxygen inhibition layer around the non-bonding base 214 inhibits the polymerization of the cantilever synthetic resin 230.

For reference, the liquid cantilever synthetic resin, that is, the hydrogel is cured while being bonded onto the surface of glass or metal, but is not bonded to PDMS. The reason is that since the PDMS is an oxygen permeable material, a thin oxygen inhibition layer is always present on the surface thereof. For this reason, when curing the hydrogel cantilever in the base block made of glass or PDMS, a cantilever portion corresponding to the bonding base is bonded with the glass and a free-end portion of the cantilever is very easily detached from the PDMS.

Further, bonding when the hydrogel is cured is important even when the cover block is manufactured. The cover block needs to be basically a transparent material. In order to use the glass as the cover block, surface treatment needs to be performed on the glass surface, and in this case, the PDMS is cured by spin-coating and then used as the cover block. Since the PDMS is not bonded to the hydrogel, the PDMS is used for surface treatment. The two materials are suitable for the use thereof due to good permeability. Alternatively, the PDMS making a pattern is thickened and then may be easily used as the cover block.

Accordingly, the cantilever 130 is bonded to the upper surface of the bonding base 212, but a protruding portion (hereinafter, a free-end portion) is smoothly placed on the non-bonding base 214, but not bonded to the non-bonding base 214. Therefore, the cantilever 130 may be formed by curing the cantilever synthetic resin 230, and the non-bonding base 214 may be easily separated from the bonding base 212. For reference, the manufacturing process may be monitored by using a CCD camera connected to a PC and a monitor.

In the embodiment, for a specific-shaped microcantilever, a beam splitter is used and a mask capable of transmitting light corresponding to the shape of the designed microcantilever may also be used.

The cantilever 130 is crosslinked via the bonding base 212 and the non-bonding base 214, and then the cantilever synthetic resin 230 which is not exposed to the light around the cantilever 130 is washed with isopropyl alcohol (IPA) and water and dried at room temperature.

The dried cantilever 130 may be further exposed to UV for 1 to 2 minutes for more rigid crosslinking.

Further, the cover block 220 includes a cover glass 222 and a cover synthetic resin 224 accommodating the cover glass 222, and the cover synthetic resin 224 includes polydimethylsiloxane. In the process of curing the cantilever synthetic resin 230, an oxygen inhibition layer on the lower surface of the cover synthetic resin 224 inhibits the polymerization of the cantilever synthetic resin 230 and thus, the microcantilever 130 is not bonded to the lower surface of the cover synthetic resin 224. Accordingly, after patterning the microcantilever 130, the cover block 220 is easily separated from the microcantilever 130.

Meanwhile, if the microcantilever 130 is removed from the base block 210, the microcantilever 130 may be easily removed by cutting the non-bonding base 214 using a cutter as illustrated in FIG. 12. Since one end of the microcantilever 130 is fixed to the bonding base 212 in a cantilever form, the microcantilever 130 provides the bonding base 212 and a cantilever block having the microcantilever 130 and may be used as various sensors.

In particular, the upper surface of the microcantilever 130 may be formed to correspond to the lower surface of the cover block 220, and specifically, it is easy to flatly form the upper surface of the microcantilever 130, and thus, it is very important to mount the probe described above thereon.

In FIG. 12, a scanning probe microscope for measuring a temperature of a sample using the microcantilever described above is illustrated. Referring to FIG. 12, light emitted from a laser is irradiated to a quantum dot integrated cantilever seated on a cantilever mount through a wave plate and a beam splitter. This light is moved to the photodiode again to measure the temperature of the sample. For reference, a semiconductor diode, also called a photodiode, is a type of optical sensor that can convert light energy into electrical energy.

A series of process of measuring the temperature of the sample in the probe of the cantilever by irradiating the laser light to the sample may be observed through a CCD camera connected to the PC monitor.

Further, in a sample seated on a piezo stage, the light may be irradiated to the sample from an excitation light source through an excitation filter, and also observed through the CCD camera.

As described above, although the present invention has been disclosed with reference to the preferred embodiments, those skilled in the art will appreciate that various modifications, additions and substitutions are possible, without departing from the scope and spirit of the invention as disclosed in the accompanying claims.

INDUSTRIAL AVAILABILITY

According to the method for manufacturing the microcantilever according to the present invention, it is possible to manufacture the microcantilever capable of measuring a temperature and the produced microcantilever can measure a temperature at a scanning probe microscopic resolution level.

The invention claimed is:

1. A method for manufacturing a microcantilever having a cantilever and a functional probe provided on the cantilever, the method comprising steps of:
   providing a probe mold which accommodates a liquid probe solution in which quantum dots for the functional probe are mixed, and has a groove corresponding to the shape of the functional probe;
   bringing a cantilever into contact with the probe mold on which the groove is formed to correspond to the location of the functional probe;
   forming the functional probe on the cantilever by curing the probe solution accommodated in the groove in a state where the cantilever contacts the probe mold; and
   separating the cantilever from the probe mold.

2. The method of claim 1, wherein the shape of the probe mold is modified to modify the shape of the groove, and the functional probe is formed to correspond to the shape of the groove.

3. The method of claim 2, wherein a pressing member which presses the probe mold from the outside is provided, and the functional probe is formed to correspond to the shape of the groove which is modified by pressing the probe mold by the pressing member.

4. The method of claim 1, wherein the probe solution includes a UV curing agent and the functional probe is formed by curing the UV curing agent.

5. The method of claim 1, wherein the cured liquid probe solution has a relatively stronger bonding property to the cantilever than the probe mold.

6. The method of claim 5, wherein the probe solution and the cantilever include any one of 1,6-hexanediol diacrylate (HDDA) and polyethylene glycol diacrylate (PEGDA), and the probe mold includes polydimethylsiloxane (PDMS).

7. The method of claim 1, wherein the cantilever is provided by steps of:
provided by steps of:
  providing a base block having a bonding base and a non-bonding base;
  providing a liquid cantilever synthetic resin on the upper surface of the base block to correspond to the thickness of the cantilever; and
  curing the cantilever synthetic resin via a boundary between the bonding base and the non-bonding base by irradiating light to the liquid cantilever synthetic resin including a light curing agent, and
  the bonding base has a relatively stronger bonding property to the cured cantilever synthetic resin than the non-bonding base.

8. The method of claim 7, wherein the non-bonding base includes polydimethylsiloxane (PDMS), the cantilever synthetic resin includes polyethylene glycol diacrylate (PEGDA), and the cantilever formed by curing the liquid cantilever synthetic resin is bonded to the upper surface of the bonding base and is not bonded to the upper surface of the non-bonding base.

9. The method of claim 7, wherein in the providing of the liquid cantilever synthetic resin with a thickness corresponding to the thickness of the cantilever,
  while a cover block is in close contact with the upper surface of the base block, the cover block is spaced apart from the base block with a gap corresponding to the thickness of the cantilever to inject the liquid cantilever synthetic resin between the base block and the cover block by a capillary phenomenon.

10. The method of claim 9, wherein the cover block includes polydimethylsiloxane (PDMS), the cantilever synthetic resin includes polyethylene glycol diacrylate (PEGDA), and the cantilever formed by curing the liquid cantilever synthetic resin is not bonded to the cover block.

11. The method of claim 7, wherein the bonding base uses glass.

* * * * *